(12) United States Patent
Kim et al.

(10) Patent No.: US 8,253,874 B2
(45) Date of Patent: Aug. 28, 2012

(54) LIQUID CRYSTAL DISPLAY WITH DIFFERENT VOLTAGES APPLIED ON STORAGE ELECTRODE LINES

(75) Inventors: Dong-Gyu Kim, Yongin-si (KR); Hye-Seok Na, Seoul (KR)

(73) Assignee: Samsung Electronics Co., Ltd. (KR)

( * ) Notice: Subject to any disclaimer, the term of this patent is extended or adjusted under 35 U.S.C. 154(b) by 698 days.

(21) Appl. No.: 12/369,817

(22) Filed: Feb. 12, 2009

(65) Prior Publication Data

US 2010/0045883 A1 Feb. 25, 2010

(30) Foreign Application Priority Data

Aug. 22, 2008 (KR) .................. 10-2008-0082354

(51) Int. Cl.
*G02F 1/1343* (2006.01)
*G02F 1/136* (2006.01)
*G09G 3/36* (2006.01)
*H01L 29/04* (2006.01)

(52) U.S. Cl. ............... 349/39; 349/38; 349/42; 349/43; 349/44; 349/45; 349/46; 349/47; 349/48; 345/92; 257/59; 257/72

(58) Field of Classification Search ............. 349/42–48; 345/92; 257/59, 72
See application file for complete search history.

(56) References Cited

U.S. PATENT DOCUMENTS

| | | | | |
|---|---|---|---|---|
| 5,870,075 A | * | 2/1999 | Yamazaki et al. | 345/92 |
| 6,028,577 A | * | 2/2000 | Sakamoto | 345/92 |
| 6,300,977 B1 | * | 10/2001 | Waechter et al. | 348/300 |

FOREIGN PATENT DOCUMENTS

| | | |
|---|---|---|
| KR | 1020030091357 | 12/2003 |
| KR | 1020040061496 | 7/2004 |
| KR | 1020040080958 | 9/2004 |
| KR | 1020050001742 | 1/2005 |
| KR | 1020050003281 | 1/2005 |
| KR | 1020050060730 | 6/2005 |
| KR | 1020060018395 | 3/2006 |
| KR | 1020060070464 | 6/2006 |
| KR | 1020070025528 | 3/2007 |
| KR | 1020070101689 | 10/2007 |
| KR | 1020080001945 | 1/2008 |

\* cited by examiner

*Primary Examiner* — Hoan C Nguyen
(74) *Attorney, Agent, or Firm* — Cantor Colburn LLP

(57) ABSTRACT

A liquid crystal display including a pixel electrode having first and second sub-pixel electrodes separated from each other; a gate line electrically connected to the first and second sub-pixel electrodes through thin film transistors, a data line electrically connected to the first and second sub-pixel electrodes through the thin film transistors, a first storage electrode line having a first storage electrode overlapped with the first sub-pixel electrode, wherein a first storage voltage is applied to the first storage electrode line as a cyclic signal; and a second storage electrode line having a second storage electrode overlapped with the second sub-pixel electrode, wherein a second storage electrode voltage opposite in phase to the first storage electrode voltage is applied to the second storage electrode line as a cyclic signal, and wherein the first and second sub-pixel electrodes are electrically connected to the same gate line and to the same data line through the thin film transistors, and the pixel electrode includes a first side disposed parallel to the gate line and a second side disposed parallel to the data line, the second side including a length which is less than a length of the first side.

12 Claims, 14 Drawing Sheets

LIQUID CRYSTAL DISPLAY WITH DIFFERENT VOLTAGES APPLIED ON STORAGE ELECTRODE LINES

This application claims priority to Korean Patent Application No. 10-2008-0082354, filed on Aug. 22, 2008, and all the benefits accruing therefrom under 35 U.S.C. §119, the contents of which in its entirety are herein incorporated by reference.

BACKGROUND OF THE INVENTION (a) Field of the Invention

This disclosure relates to a liquid crystal display.

(b) Description of the Related Art

A liquid crystal display is a type of flat panel display. A liquid crystal display includes two display panels on which field-generating electrodes, including a pixel electrode and common electrode, are disposed and a liquid crystal layer interposed between the display panels. In the liquid crystal display, a voltage is applied to the field-generating electrodes to generate an electric field across the liquid crystal layer, thereby controlling an alignment of liquid crystal molecules of the liquid crystal layer with the electric field. Accordingly, a polarization of incident light can be controlled, and an image displayed.

The liquid crystal display further includes a switching element electrically connected to the pixel electrode, and a plurality of signal lines, including a gate line and a data line, for applying a voltage to the pixel electrode by controlling the switching elements.

In a vertical alignment (VA) mode liquid crystal display, in which a director of the liquid crystal molecules stands vertically relative to a surface of the display panels when an electric field is not applied thereto, it is desirable to have a high contrast ratio and a wide reference viewing angle. A wide viewing angle is a viewing angle with a contrast ratio of 1:10, or an intergray luminance inversion limitation angle.

In the vertical alignment (VA) mode liquid crystal display, it can be desirable to make a lateral visibility approximate a frontal visibility. In order to make the lateral visibility approximate the frontal visibility, it has been proposed that one pixel be bisected into two sub-pixels, while different voltages are applied thereto to differentiate a light transmittance thereof from each other.

For example, bisected sub-pixels can be capacitor-combined with each other, and a voltage applied directly to one sub-pixel while a voltage drop induced by the capacitor combination reduces the voltage to the other sub-pixel, thereby differentiating the voltages applied to the two sub-pixels from each other so as to select a different light transmittance thereto. However, such a method may involve a loss in overall light transmittance because the voltages applied to each of the two sub-pixels are lowered. Alternatively, a number of the gate lines or the data lines may be increased to thereby apply a different voltage to each of the two sub-pixels. However, as the number of the gate lines or the data lines increases, an aperture ratio of the liquid crystal display is reduced.

Several attempts have been made to improve motion picture display quality in a liquid crystal display, including the development of high speed driving, for example. High speed driving can consume significant power because of the rapid frame speed, and hence a column inversion driving mode has been introduced to reduce power consumption.

However, with the column inversion driving mode, when a relatively high gray box is displayed on a relatively low gray ground screen, vertical crosstalk may occur at the top and the bottom of the box with a different gray from that of the ground screen. Furthermore, when data voltages with the same polarity are applied in a vertical direction, and pixel voltages with positive and negative polarities differ from each other, flicker may be generated.

Accordingly, a liquid crystal display with improved lateral visibility, improved display quality, and high speed driving would be desirable.

BRIEF SUMMARY OF THE INVENTION

The disclosed embodiments provide a liquid crystal display having advantages of effectively enhancing a lateral visibility, and heightening a display quality with high speed driving.

The above described and other drawbacks are alleviated by a liquid crystal display including a plurality of pixel electrodes, each having first and second sub-pixel electrodes separated from each other, a plurality of gate lines electrically connected to the first and second sub-pixel electrodes; a plurality of data lines electrically connected to the first and second sub-pixel electrodes; a plurality of first storage electrode lines having first storage electrodes overlapped with the first sub-pixel electrodes, wherein a first storage electrode voltage is applied to the first storage electrode lines as a cyclic signal; and a plurality of second storage electrode lines having a second storage electrodes overlapped with the second sub-pixel electrodes, wherein a second storage electrode voltage opposite in phase to the first storage electrode voltage is applied to the second storage electrode line as a cyclic signal, and wherein the first and second sub-pixel electrodes are electrically connected to the same gate line and to the same data line, and the pixel electrodes include a first side disposed parallel to the gate line and a second side disposed parallel to the data line, the second side including a length which is less than a length of the first side.

In an embodiment, the first and the second storage electrode voltages each have a cycle of 2H.

In an embodiment, the pixel electrodes are disposed in a same pixel column and pairs of neighboring pixel electrodes are electrically connected to the same data line.

In an embodiment, a plurality of data voltages are applied to a same data line and have the same polarity during a period of one frame.

In an embodiment, two of the data lines neighbor each other and the data voltages applied to the two data lines neighboring each other are opposite in polarity.

In an embodiment, the liquid crystal display further includes an organic insulator interposed between the pixel electrodes and the gate lines and the data lines, wherein the pixel electrodes are overlapped with the gate lines or the data lines.

In an embodiment, the first and second sub-pixel electrodes each include a plurality of branches, each of the branches including a side, the sides of the branches disposed in different directions relative to each other.

In an embodiment, the sides are disposed at an angle of about 45° or about 135° with respect to the gate line.

In an embodiment, the second sub-pixel electrodes are bisected into two parts by the first sub-pixel electrodes.

In an embodiment, the first and second storage electrode lines each traverse a gap disposed between the first and second sub-pixel electrodes.

In an embodiment, the first and second storage electrode lines are disposed parallel to the data line.

In an embodiment, the length of the first side is about three times the length of the second side.

Also disclosed is a liquid crystal display including a plurality of pixel electrodes; a plurality of gate lines electrically connected to the pixel electrodes; and a plurality of pairs of first and second data lines disposed perpendicular to the gate lines and facing each with respect to the pixel electrodes, wherein two neighboring pixel electrodes, which neighbor each other in a column direction, are electrically connected to the first and second data lines, respectively, each pixel electrode including a first side disposed parallel to the gate lines and a second side disposed parallel to the data lines, the second side having a length which is shorter than a length of the first side, and wherein a plurality of data voltages applied to a single data line have the same polarity during a period of one frame.

In an embodiment, two of the data lines neighbor each other and the data voltages applied to the two data lines neighboring each other are opposite in polarity.

In an embodiment, two of the gate lines neighbor each other and the same gate voltage is applied to two of the gate lines neighboring each other.

In an embodiment, a liquid crystal display further includes first and second sub-pixel electrodes separated from each other and electrically connected to the same gate line and the same data line; a plurality of first storage electrode lines including first storage electrodes overlapped with the first sub-pixel electrodes or the second sub-pixel electrodes and receiving a first storage electrode voltage as a cyclic signal; and a plurality of second storage electrode lines including second storage electrodes overlapped with the first sub-pixel electrodes or the second sub-pixel electrodes and receiving a second storage electrode voltage, which is opposite in phase to the first storage electrode voltage, as a cyclic signal.

In an embodiment, the first and second storage electrode voltages each have a cycle of 2H.

In an embodiment, an organic insulator is interposed between the pixel electrode and the gate lines and the data lines, wherein the pixel electrodes overlap the gate lines or the data lines.

In an embodiment, the first and second sub-pixel electrodes each include a plurality of branches, each of the branches including a side, the sides of the branches disposed in different directions relative to each other.

In an embodiment, the sides of the branches are disposed at an angle of about 45° or about 135° with respect to the gate line.

In an embodiment, the second sub-pixel electrodes are bisected into two parts by the first sub-pixel electrodes, respectively.

In an embodiment, the first and second storage electrode lines each traverse a gap disposed between each of the first and second sub-pixel electrodes.

In an embodiment, the first and second storage electrode lines are disposed parallel to the data lines.

In an embodiment, the length of the first side is about three times the length of the second side.

The disclosed liquid crystal display structure improves lateral visibility, and the display quality thereof is improved even with high speed driving.

These and other features, aspects, and advantages of the disclosed embodiments will become better understood with reference to the following description and appended claims.

BRIEF DESCRIPTION OF THE DRAWINGS

The disclosed subject matter is particularly pointed out and distinctly claimed in the claims at the conclusion of the specification. The foregoing and other objects, features, and advantages of the disclosed embodiments are apparent from the following detailed description taken in conjunction with the accompanying drawings in which:

Figure 1:
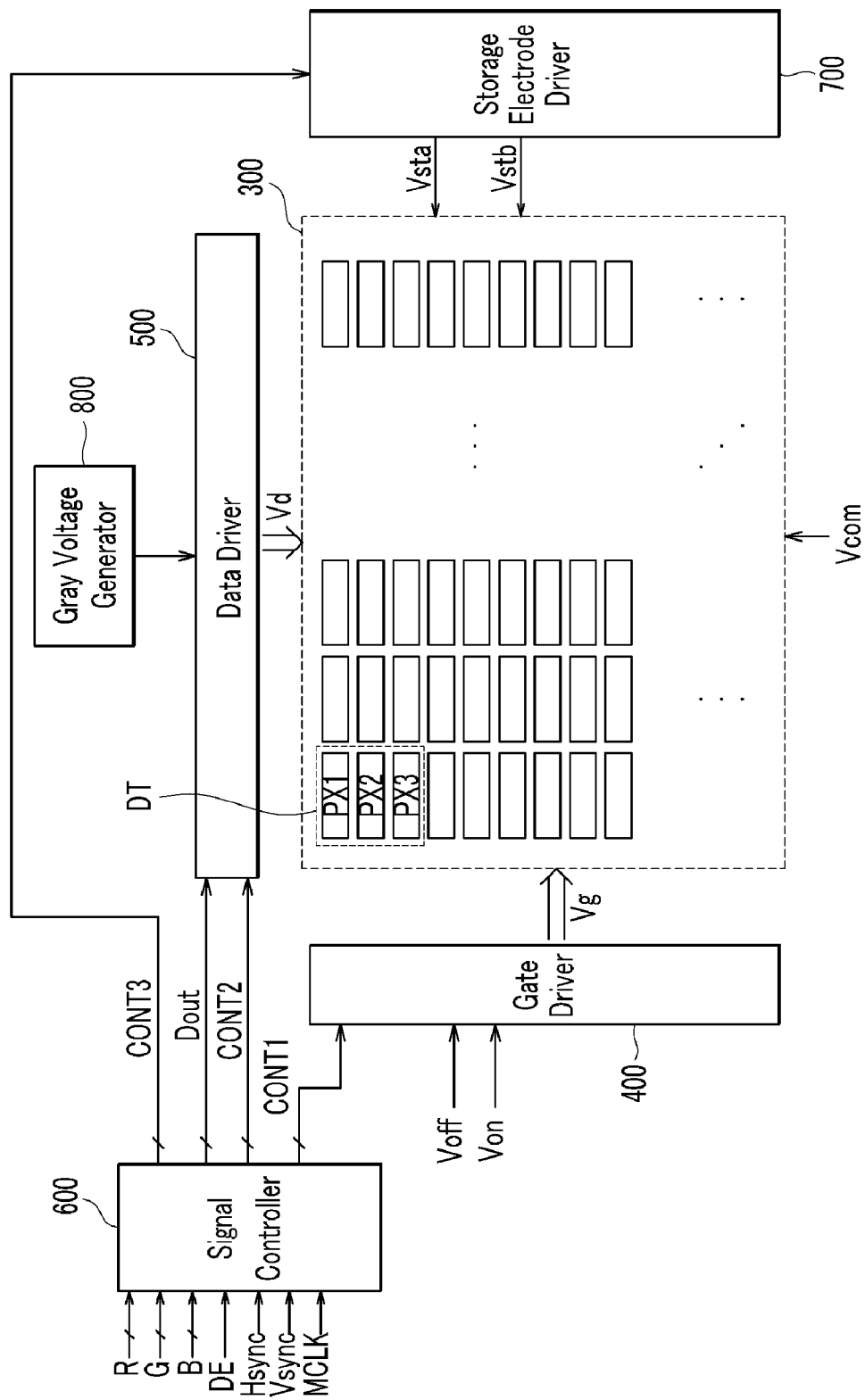
FIG. 1 is a block diagram showing an exemplary embodiment of a liquid crystal display.

The detailed description explains the disclosed embodiments, together with advantages and features, by way of example with reference to the drawings.

DETAILED DESCRIPTION OF THE INVENTION

The invention is described more fully hereinafter with reference to the accompanying drawings, in which exemplary embodiments of the invention are shown. As those skilled in the art would realize, the disclosed embodiments may be modified in various different ways, all without departing from the spirit or scope of the invention.

Aspects, advantages, and features of the present invention and methods of accomplishing the same may be understood more readily by reference to the following detailed description of preferred embodiments and the accompanying drawings. The present invention may, however, may be embodied in many different forms, and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer, or section from another region, layer or section. Thus, a first element, component, region, layer, or section discussed below could be termed a second element, component, region, layer, or section without departing from the teachings of the present invention.

Spatially relative terms, such as "below", "lower", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings. However, the aspects, features, and advantages of the present invention are not restricted to the ones set forth herein. The above and other aspects, features and advantages of the present invention will become more apparent to one of ordinary skill in the art to which the present invention pertains by referencing a detailed description of the present invention given below.

A liquid crystal display according to an exemplary embodiment is first described in detail with reference to FIG. 1 to FIG. 3.

Figure 2:
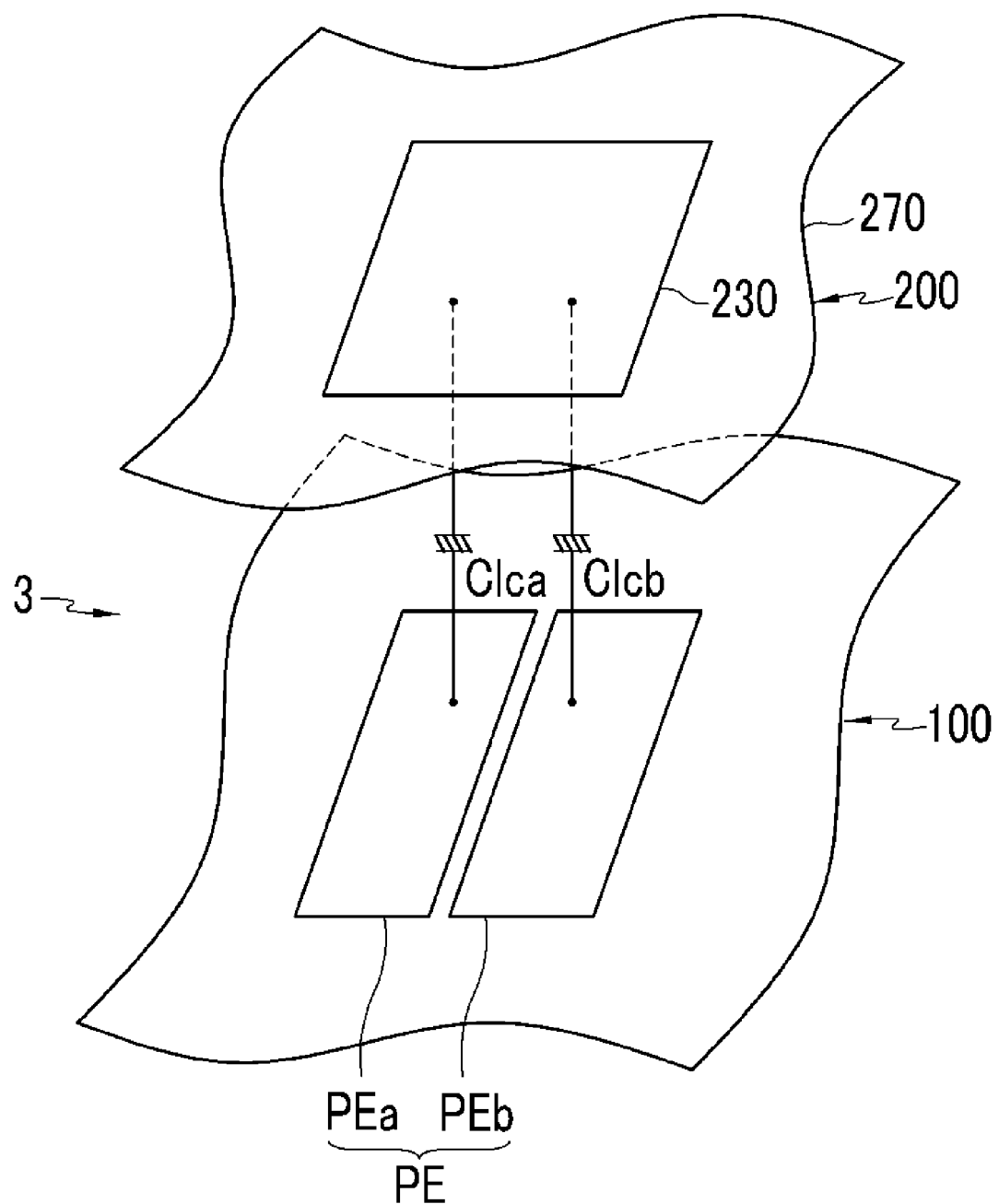
FIG. 2 is an equivalent circuit diagram showing an exemplary embodiment of two sub-pixels in a liquid crystal display.
Figure 3:
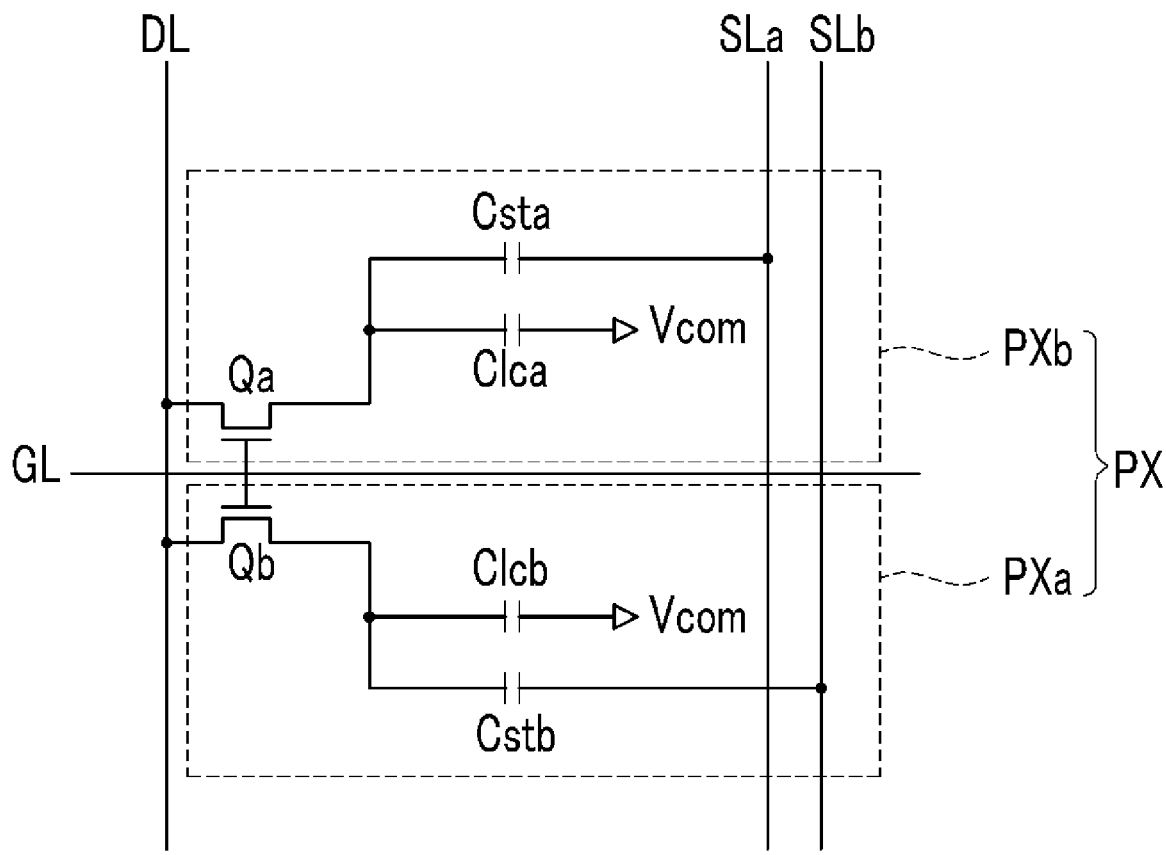
FIG. 3 is an equivalent circuit diagram showing an exemplary embodiment of a pixel in a liquid crystal display.

FIG. 1 is a block diagram showing an exemplary embodiment of a liquid crystal display, FIG. 2 is an equivalent circuit diagram showing an exemplary embodiment of two sub-pixels in a liquid crystal display, and FIG. 3 is an equivalent circuit diagram showing an exemplary embodiment of a pixel in a liquid crystal display.

As shown in FIG. 1, a liquid crystal display according to an exemplary embodiment includes a liquid crystal panel assembly 300. A gate driver 400, a data driver 500, and a storage electrode driver 700 are electrically connected to the liquid crystal panel assembly 300. A gray voltage generator 800 is electrically connected to the data driver 500, and a signal controller 600, for controlling the gate driver 400, the data driver 500, and the storage electrode driver 700, is electrically connected to the gate driver 400, the data driver 500, and the storage electrode driver 700.

From the perspective of an equivalent circuit, the liquid crystal panel assembly 300 includes a plurality of signal lines, comprising gate lines GL, data lines DL, first storage electrode lines SLa and second storage electrode lines SLb, and a plurality of pixels, including first pixels PX1, second pixels PX2, and third pixels PX3, each electrically connected to the plurality of signal lines GL, DL, SLa, and SLb and arranged substantially in the form of a matrix. In an embodiment, as shown in FIG. 2, the liquid crystal panel assembly 300 includes a lower display panel 100 and an upper display panel 200 facing each other, and a liquid crystal layer 3 interposed between the lower display panel 100 and the upper display panel 200.

The signal lines include a plurality of gate lines GL for carrying gate voltages Vg (also called "scanning signals"), a plurality of data lines DL for carrying data voltages Vd, and a plurality of pairs of first and second storage electrode lines SLa and SLb for carrying storage electrode voltages Vsta and Vstb. The gate lines GL are disposed roughly in a row direction and are substantially parallel to each other, and the data lines DL and the first and second storage electrode lines SLa and SLb are disposed roughly in a column direction and are substantially parallel to each other.

The liquid crystal panel assembly according to an exemplary embodiment includes a plurality of signal lines, which includes a plurality of gate lines GL, a plurality of data lines DL, and a plurality of pairs of the first and second storage electrode lines SLa and SLb, and a plurality of pixels, including the first to the third pixels PX1 to PX3, which are electrically connected to the signal lines.

The pixels, such as the first, the second, and the third pixels PX1, PX2, and PX3, each comprise a pair of sub-pixels, including first and second sub-pixels PXa and PXb. The first and second sub-pixels PXa and PXb include first and second switching elements Qa and Qb, respectively, electrically connected to the gate lines GL and the data lines DL, first and second liquid crystal capacitors Clca and Clcb electrically connected to the first and second switching elements Qa and Qb, and first and second storage capacitors Csta and Cstb electrically connected to the first and second switching elements Qa and Qb and the first and second storage electrode lines SLa and SLb, respectively.

The first and second switching elements Qa and Qb are three terminal elements, such as thin film transistors, and can be disposed on the lower display panel 100. A control terminal of the first and second switching elements Qa and Qb is electrically connected to the gate lines GL, an input terminal thereof is electrically connected to the data lines DL, and the output terminal thereof is electrically connected to the first and second liquid crystal capacitors Clca and Clcb and the first and second storage capacitors Csta and Cstb, respectively.

The first and second liquid crystal capacitors Clca and Clcb comprise first and second sub-pixel electrodes PEa and PEb of the lower display panel 100 as first terminals and a common electrode 270 of the upper display panel 200 as second terminals, and the liquid crystal layer 3, which is interposed between the first and second sub-pixel electrodes PEa and PEb and the common electrode 270, as a dielectric. The pair of sub-pixel electrodes, specifically the first and second sub-pixel electrodes PEa and PEb, are separated from each other, and can form first pixel electrodes PE. The common electrode 270 can be disposed on an entire surface of the upper display panel 200, and can receive a common voltage Vcom. The liquid crystal layer 3 can have a negative dielectric anisotropy, and liquid crystal molecules of the liquid crystal layer 3 may be aligned when an electric field is not applied such that directors thereof are vertical relative to a surface of at least one of the upper and the lower display panels.

The first storage capacitors Csta are formed by overlapping the first storage electrode lines SLa and the first sub-pixel electrodes PEa, which are disposed on the lower display panel 100, and interposing an insulator. The second storage capacitors Cstb are formed by overlapping the second storage electrode lines SLb and the second sub-pixel electrodes PEb, and interposing an insulator. First and second storage electrode voltages Vsta and Vstb are applied to the first and second storage electrode lines SLa and SLb.

In an embodiment, when a color image is displayed, the first to third pixels PX1 to PX3 can each display one of the primary colors (spatial division), respectively, or the first to third pixels PX1 to PX3 can alternately display the primary colors in a temporal order (temporal division), respectively, so as to display the desired colors by spatial and temporal sums of the primary colors. The primary colors may be red, green, and blue. FIG. 2 illustrates spatial division, where a color filter 230 for displaying one of the primary colors is disposed on the upper display panel 200 at the respective pixels PX1 to PX3. In an embodiment distinct from that shown in FIG. 2, the color filter 230 may be disposed over or below the first and second sub-pixel electrodes PEa and PEb of the lower display panel 100.

As disclosed above, the first to third pixels PX1 to PX3 for displaying the three primary colors form a dot DT as a basic unit of color image display.

Polarizers (not shown) can be disposed on outer surfaces of the lower display panel 100, and the upper display panel 200, such that a polarization axes thereof are perpendicular to each other. In an embodiment comprising a reflective liquid crystal display, one of the polarizers may be omitted. If the polarizers are crossed polarizers, light incident upon the liquid crystal layer 3 is blocked when an electric field is not applied thereto.

Referring to FIG. 1, the gray voltage generator 800 generates a gray voltage (or reference gray voltages) relevant to the transmittance of the first to third pixels PX1 to PX3.

The gate driver 400 is electrically connected to the gate lines of the liquid crystal panel assembly 300 and applies gate voltages Vg, comprising combinations of a gate-on voltage Von and a gate-off voltage Voff, to the gate lines.

The data driver 500 is electrically connected to the data lines of the liquid crystal panel assembly 300 and selects gray voltages from the gray voltage generator 800 and applies the gray voltage to the data lines as data voltages. In an embodiment, the gray voltage generator 800 generates a portion of the gray voltages and the data driver 500 divides the gray voltages to thereby generate all of the gray voltages, and selects data voltages therefrom.

The storage electrode driver 700 is electrically connected to the first and second storage electrode lines SLa and SLb and applies a pair of storage electrode voltages, the first and second storage electrode voltages Vsta and Vstb, which are opposite in phase to each other, to the first and second storage electrode lines SLa and SLb, respectively.

The signal controller 600 controls the gate driver 400, the data driver 500, and the storage electrode driver 700.

In an embodiment, the gate driver 400, the data driver 500, the signal controller 600, the storage electrode driver 700, and the gray voltage driver 800 are disposed directly on the liquid crystal panel assembly 300 as at least one integrated circuit ("IC") chip, or can be disposed on a flexible printed circuit film (not shown) and attached to the liquid crystal panel assembly 300 in the form of a tape carrier package ("TCP"). In another embodiment, the gate driver 400, the data driver 500, the signal controller 600, the storage electrode driver 700, and the gray voltage driver 800 may be disposed on a separate printed circuit board ("PCB", not shown). In another embodiment, the gate driver 400, the data driver 500, the signal controller 600, the storage electrode driver 700, and the gray voltage driver 800 may be integrated on the liquid crystal panel assembly 300. In another embodiment, the gate driver 400, the data driver 500, the signal controller 600, the storage electrode driver 700, and the gray voltage driver 800 may be integrated in a single chip, and in this embodiment at least one circuit element of the gate driver 400, the data driver 500, the signal controller 600, the storage electrode driver 700, or the gray voltage driver 800 may be disposed external to the single chip.

The structure of the liquid crystal panel assembly is described in detail with reference to FIG. 4 to FIG. 9 and the previously described drawings of FIG. 1 to FIG. 3.

Figure 4:
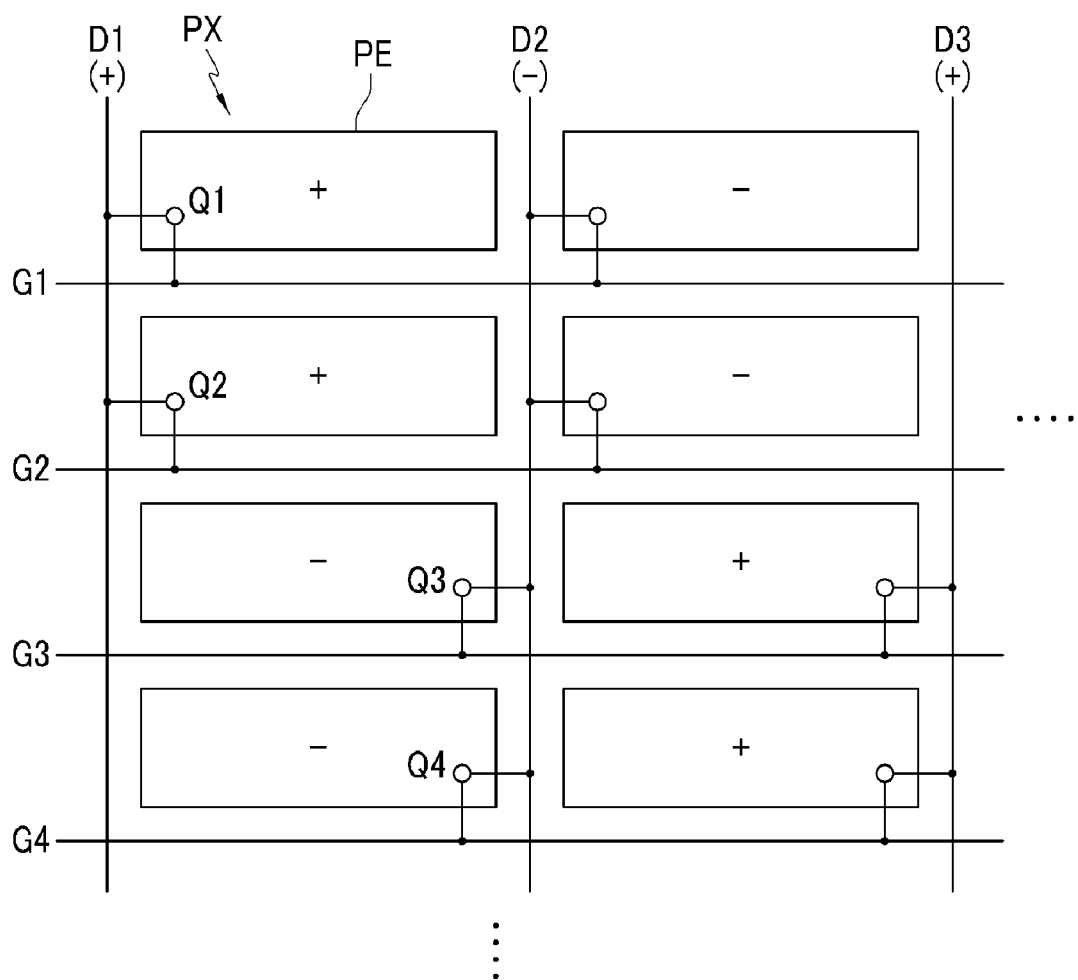
FIG. 4 is a plan view showing an exemplary embodiment of an arrangement of signal lines and pixels in a liquid crystal display.

FIG. 4 is a plan view showing an exemplary embodiment of an arrangement of signal lines and pixels in a liquid crystal display.

Referring to FIG. 4, a liquid crystal panel assembly 300 according to an exemplary embodiment includes a plurality of pixels PX arranged in the form of a matrix. The pixels PX each have a pixel electrode PE and switching elements Q1 to Q4 electrically connected to the pixel electrodes PE. A plurality of gate lines, such as first to fourth gate lines G1, G2, G3, and G4, are disposed between neighboring pixel rows disposed substantially in a horizontal direction, and a plurality of data lines, including first to third data lines D1, D2, and D3, are disposed between neighboring pixel columns, which are disposed substantially in a vertical direction. Switching elements Q1 to Q4 electrically connect each of the gate lines to each of the data lines G1 to G4 and D1 to D3, respectively.

The pixels PX in a pixel column are electrically connected to the same data line, such as the first to third data lines D1 to D3, in any two adjacent pixel rows. In an embodiment, the pixels PX disposed at the first and second rows in the first pixel column are electrically connected to the first data line D1 on a left side thereof via a first and second switching elements Q1 and Q2, respectively, and the pixels PX disposed at the third and fourth rows in the first pixel column are electrically connected to the second data line D2 on a right thereof via a third and fourth switching elements Q3 and Q4, respectively. The pixels in the second pixel column have the same electrical connection configuration as the pixels in the first pixel column.

The data voltages Vd flowing along the first and third data lines D1 and D3 have the same polarity during the period of one frame, while the data voltages Vd flowing along the first and second data lines D1 and D2, or the second and third data lines D2 and D3, are opposite in polarity to each other. Thus, in an embodiment, the data voltage Vd flowing along the first data line D1 has a positive (+) polarity, and the data voltage Vd flowing along the second data line D2 has a negative (−) polarity. The data voltage Vd flowing along the third data line D3 has a positive (+) polarity again.

Consequently, two pixels PX neighboring each other in a row direction are opposite in polarity to each other, and two neighboring pixels PX in the same pixel column have the same polarity.

In an embodiment, the driver inversion at the data driver 500 has a form of column inversion, and the apparent inversion on the screen is a form of a 2×1 dot inversion mode. When the 2×1 dot inversion mode is used, the possibility of perceiving flicker with high speed driving is reduced or substantially eliminated, compared with an embodiment using a 1×1 dot inversion mode.

A liquid crystal panel assembly according to an exemplary embodiment is described in detail with reference to FIG. 5 to FIG. 8.

Figure 5:
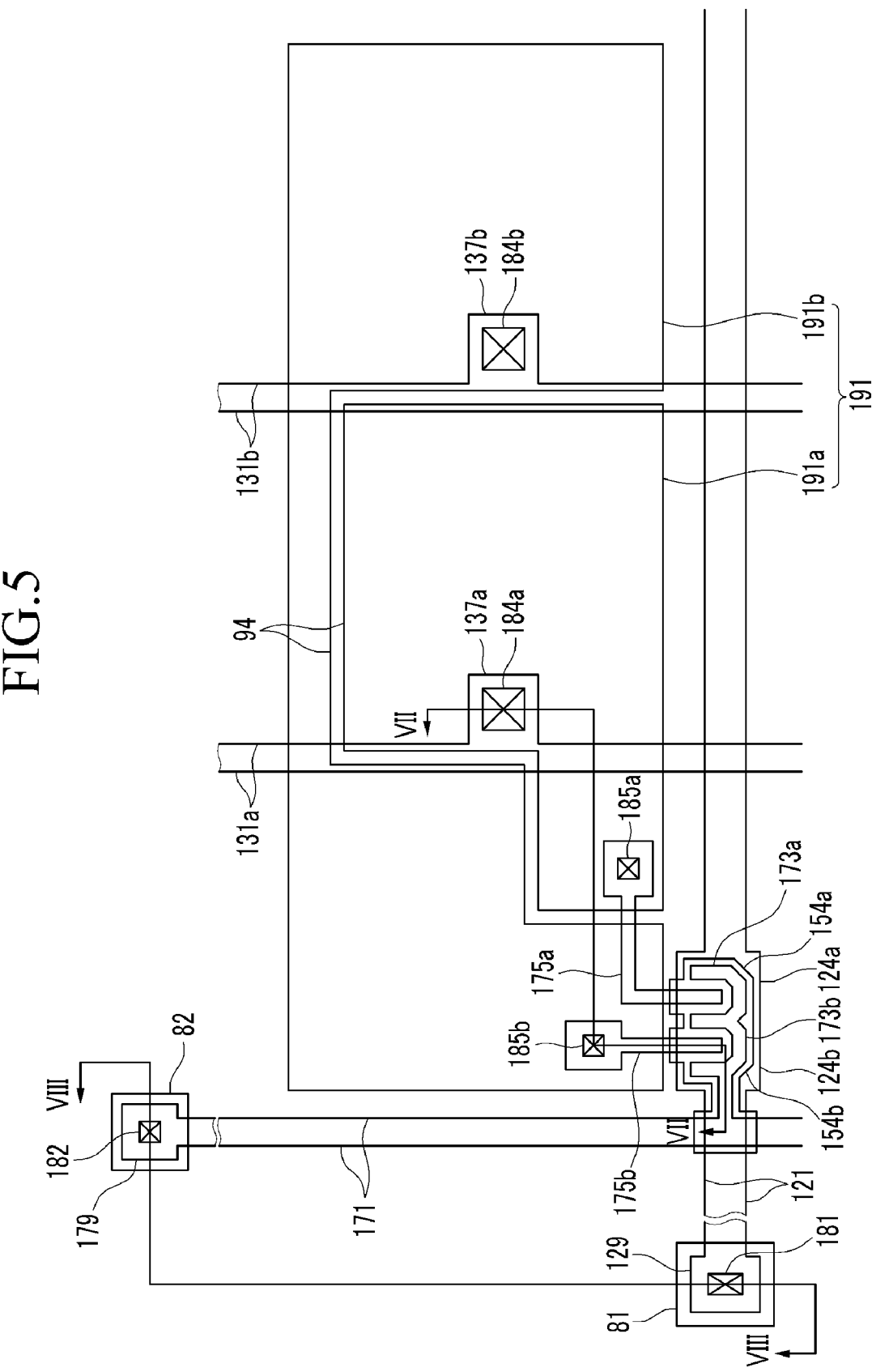
FIG. 5 is a plan view showing an exemplary embodiment of a liquid crystal panel assembly.
Figure 5A:
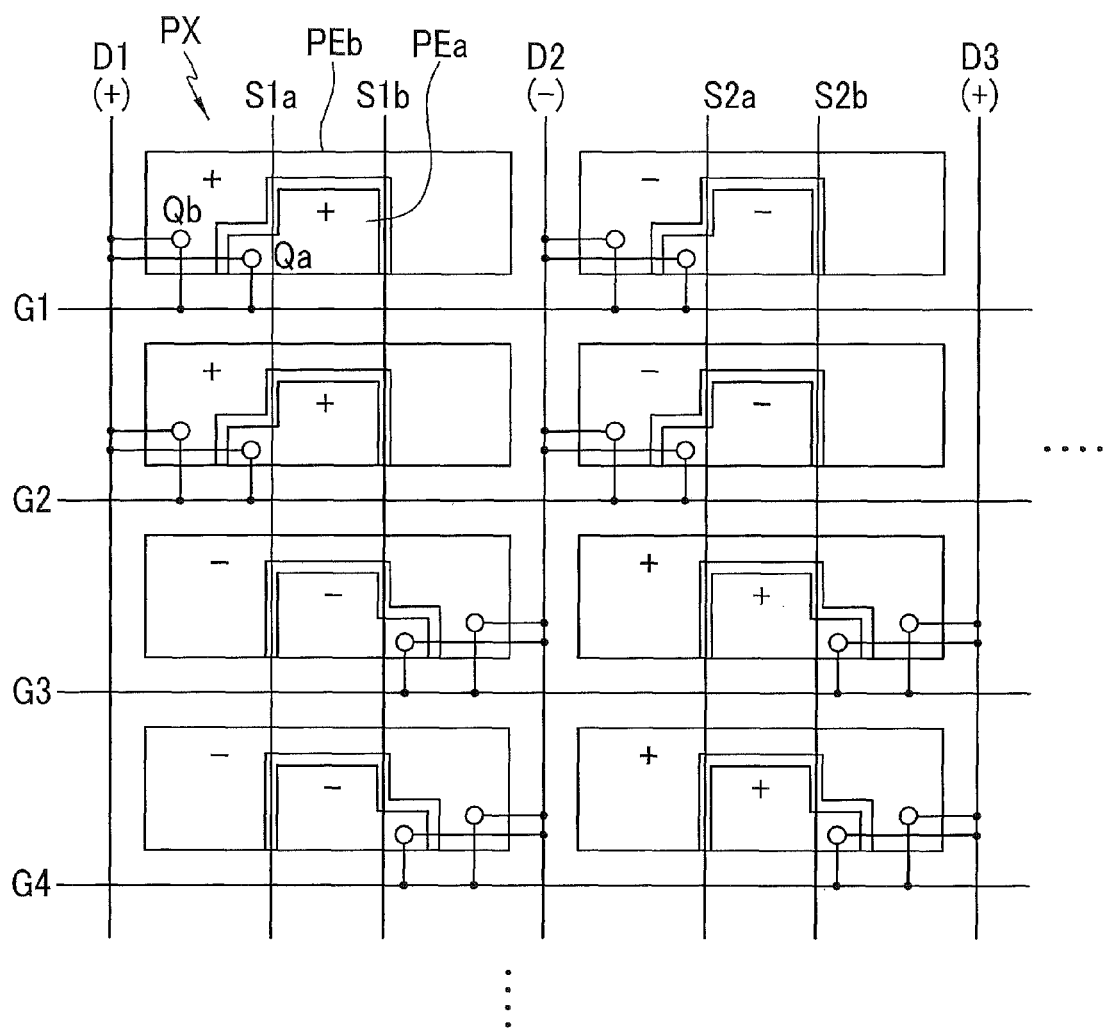
Figure 5B:
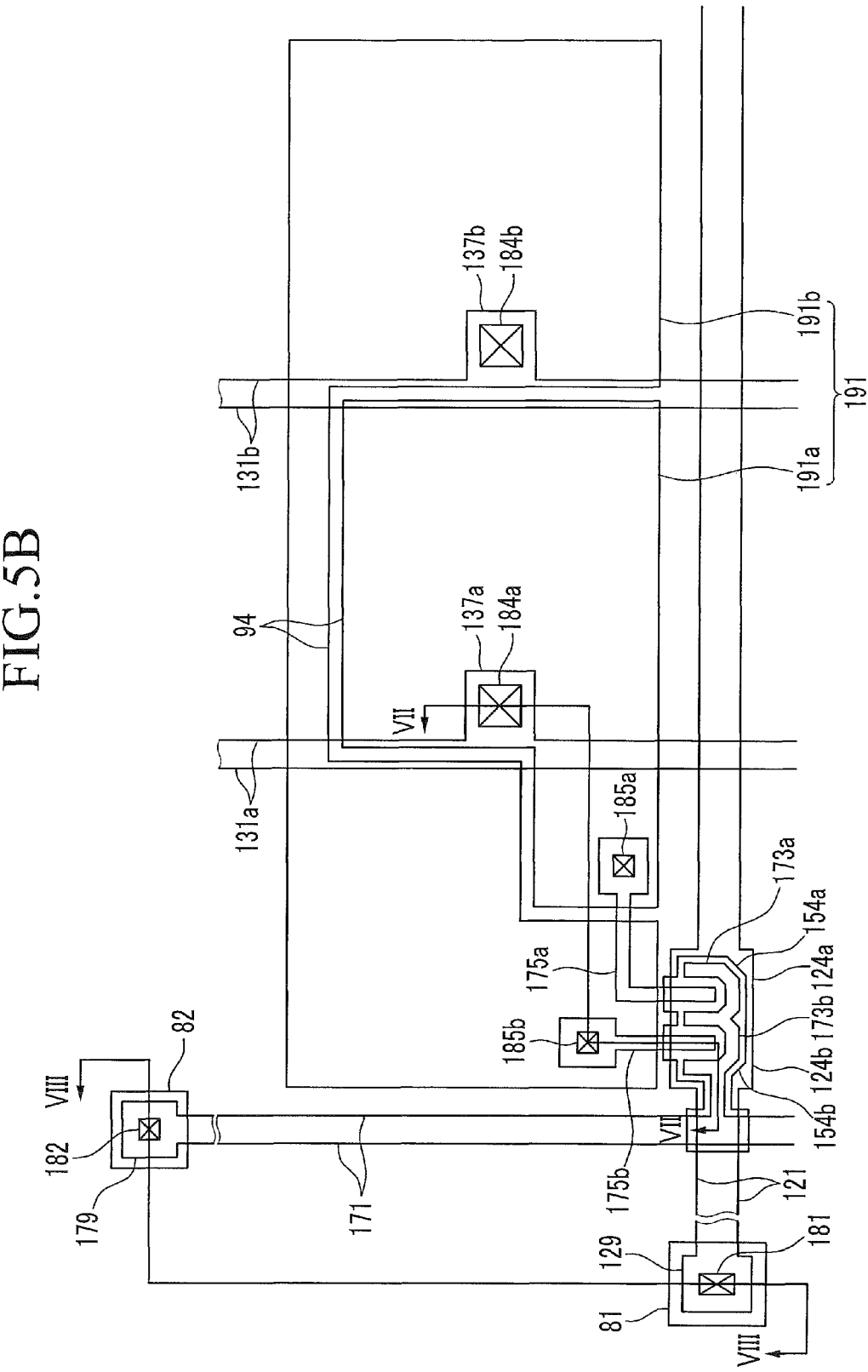
Figure 6:
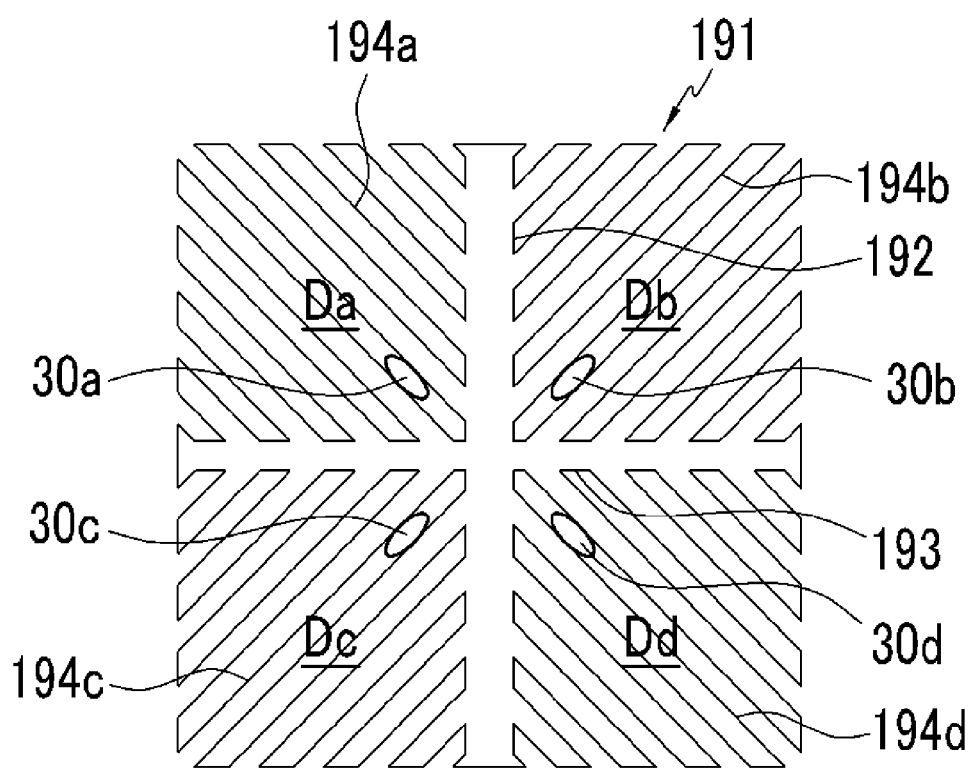
FIG. 6 is an illustration of an exemplary embodiment of a pixel electrode of the liquid crystal panel assembly shown in FIG. 5.
Figure 7:
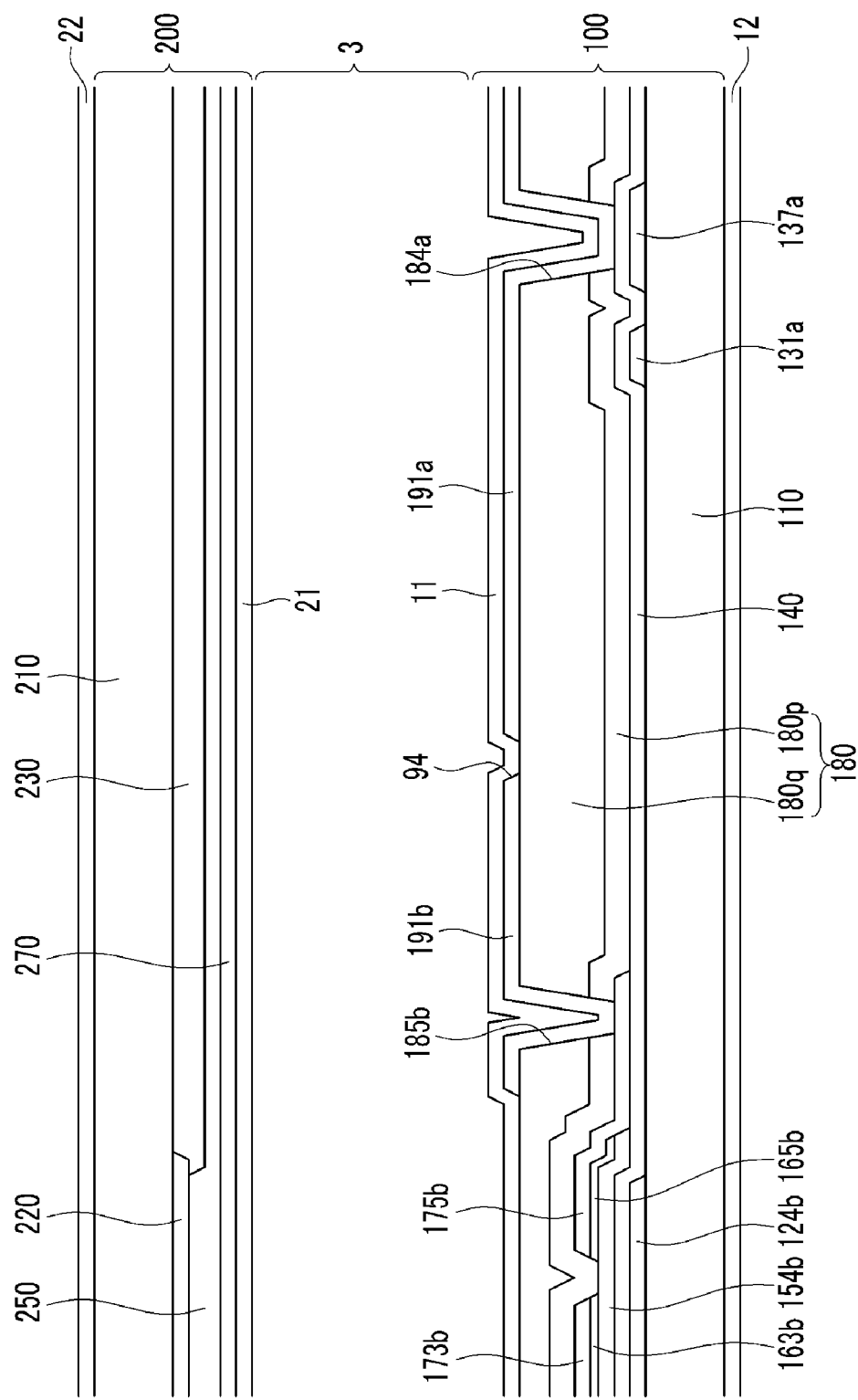
FIG. 7 and FIG. 8 are cross-sectional views showing an exemplary embodiment of the liquid crystal panel assembly shown in FIG. 5 taken along line VII-VII and line VIII-VIII.
Figure 8:
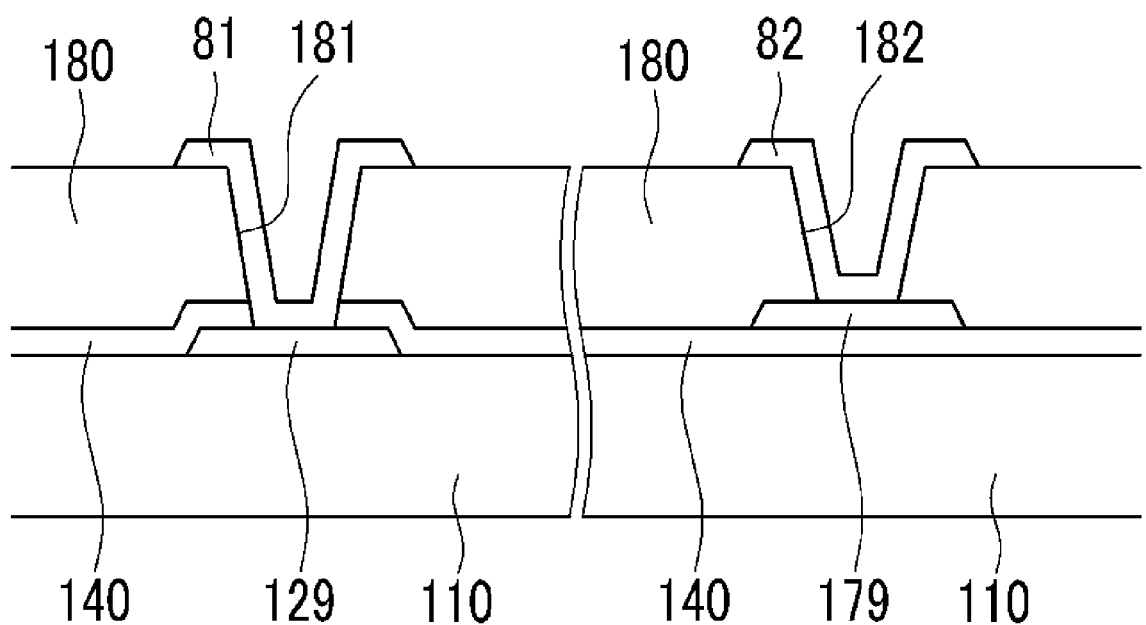

FIG. 5 is a plan view showing an exemplary embodiment of a liquid crystal panel assembly, and FIG. 6 illustrates an exemplary embodiment of a pixel electrode of the liquid crystal panel assembly shown in FIG. 5. FIG. 7 and FIG. 8 are cross-sectional views showing an exemplary embodiment of the liquid crystal panel assembly shown in FIG. 5 taken along line VII-VII and line VIII-VIII.

A liquid crystal display according to an exemplary embodiment includes a lower display panel 100 and an upper display panel 200 facing each other, a liquid crystal layer 3 interposed between the lower and the upper display panels 100 and 200, and a pair of polarizers 12 and 22 disposed on an outer surface of the lower and the upper display panels 100 and 200, respectively.

The lower display panel 100 is first described in detail.

A plurality of gate lines 121 are disposed on an insulating substrate 110. The gate lines 121 are disposed substantially in a horizontal direction, and include a first and second gate electrodes 124a and 124b, and gate line end portions 129. The first and second gate electrodes 124a and 124b are electrically connected to each other.

A gate insulating layer 140 is disposed on the gate lines 121 and the first and second gate electrodes 124a and 124b, thereby forming a gate conductor. First and second semiconductor islands 154a and 154b are disposed on the gate insulating layer 140 such that they are electrically connected to each other, and a plurality of first ohmic contacts (not shown) and a plurality of second ohmic contacts 163b, and third ohmic contacts 165b are disposed on the first and second semiconductor islands 154a and 154b.

A data conductor is disposed on the second and third ohmic contacts 163a and 165a, and the gate insulating layer 140. The data conductor includes a plurality of data lines 171, a plurality of first and second drain electrodes 175a and 175b, and a plurality of pairs of first and second storage electrode lines 131a and 131b.

The data lines 171 have a plurality of first and second source electrodes 173a and 173b, respectively, and data line end portions 179 electrically connected to at least one of the data lines, the source electrodes, and external driving circuits. The first and second source electrodes 173a and 173b are electrically connected to each other. The first and second drain electrodes 175a and 175b are separated from the data lines 171, and face the first and second source electrodes 173a and 173b, and are on the first and second gate electrodes 124a and 124b, respectively. The first and second drain electrodes 175a and 175b each comprise a wide end portion and an opposite bar-shaped end portion, and the bar-shaped end portion thereof is partially surrounded by the "U" shaped first and second source electrodes 173a and 173b, respectively.

The first and second gate electrodes 124a and 124b, the first and second source electrodes 173a and 173b, and the first and second drain electrodes 175a and 175b, and the first and second semiconductor islands 154a and 154b form first and second thin film transistors ("TFTs") Qa and Qb, respectively. The channels of the first and second thin film transistors Qa and Qb are disposed at the first and second semiconductor islands 154a and 154b between the first and second source electrodes 173a and 173b, and the first and second drain electrodes 175a and 175b, respectively.

The first and second storage electrode lines 131a and 131b are disposed substantially in a vertical direction, wherein the first storage electrode lines 131a comprise first storage electrodes 137a, and the second storage electrode lines 131b comprise second storage electrodes 137b.

A passivation layer 180 is disposed on the data conductor, which comprises the data lines 171, the first drain electrodes 175a, the second drain electrodes 175b, the first storage electrode lines 131a, the second storage electrode lines 131b, and exposed portions of the first and second semiconductor islands 154a and 154b, respectively.

The passivation layer 180 comprises a lower layer 180p which comprises an inorganic insulator, such as silicon nitride, silicon oxide, or the like, or a combination comprising at least one of the foregoing materials, and an upper layer 180q comprising an organic insulator. The organic insulator can have a dielectric constant of equal to or less than about 6, specifically equal to or less than about 4, or equal to or less than about 3. The organic insulator may be photosensitive, and may comprise a flat surface. The passivation layer 180 may comprise a single-layered structure and comprise an inorganic insulator or an organic insulator.

The passivation layer 180 comprises a plurality of contact holes, including first contact holes 182, second contact holes 185a, and third contact holes 185b, which expose end portions of the data lines 171, and the first and the second drain electrodes 175a and 175b, respectively. A plurality of fourth contact holes 181 can be disposed on the passivation layer 180 and the gate insulating layer 140 such the gate line end portions 129 of the gate lines 121 are exposed. First and second openings 184a and 184b are disposed on the upper layer 180q of the passivation layer 180 such that they expose the first and second storage electrodes 137a and 137b, respectively.

Pixel electrodes 191 and a plurality of first and second contact assistants 81 and 82, respectively, are disposed on the passivation layer 180.

In an embodiment, each pixel electrode 191 is roughly quadrangular-shaped, and has four sides that are substantially parallel to the gate line 121 or the data line 171. The two horizontal sides of the pixel electrode 191 proceeding parallel to the gate line 121 can be about three times the length of the two vertical sides thereof proceeding parallel to the data line 171. Accordingly, compared with an embodiment where the horizontal side is smaller than the vertical side, a number of the pixel electrodes 191 arranged in each pixel row can be greater than a number of the pixel electrodes 191 arranged in each pixel column. As a total number of the data lines 171 is reduced, a number of the IC chips for the data driver 500 can be reduced, thereby decreasing a material cost. In an embodiment where a number of the gate lines 121 is increased by an amount that is the same as a reduction in a number of the data lines, the gate driver 400 can be integrated on the assembly 300 together with the gate lines 121, the data lines 171, and the thin film transistors, and hence, an increase in the number of the gate lines 121 is not undesirable. Furthermore, although the gate driver 400 can be disposed as IC chips, the cost of the IC chips for the gate driver 400 can be relatively low, and it can be more advantageous to reduce a number of the IC chips for the data driver 500.

The pixel electrode 191 comprises a first and second sub-pixel electrodes 191a and 191b separated from each other. A gap 94 is interposed between the first and second sub-pixel electrodes 191a and 191b, and the second sub-pixel electrode 191b is bisected into two parts by interposing the first sub-pixel electrode 191a therebetween. Accordingly, the first sub-pixel electrode 191a does not directly neighbor the data line 171. A parasitic capacitance can be generated between the pixel electrode 191 and the data line 171 so that it may influence a voltage of the pixel electrode 191. A voltage of the second sub-pixel electrode 191b does not substantially influence an overall pixel voltage of the pixel electrode 191, particularly at a lower gray, compared with a voltage of the first sub-pixel electrode 191a. Therefore, it can be desirable in minimizing the influence of the data voltage Vd to the whole pixel electrode 191 for the second sub-pixel electrode 191b to neighbor the data line 171 rather than the first sub-pixel electrode 191a.

The first and second storage electrode lines 131a and 131b are overlapped with the gap between the first and second sub-pixel electrodes 191a and 191b. Thus, in an embodiment, an aperture ratio of the liquid crystal panel assembly can be increased.

FIG. 6 illustrates an exemplary embodiment of patterns of the first sub-pixel electrodes 191a and two part of the second sub-pixel electrodes 191b, respectively. The first and second sub-pixel electrodes 191a and 191b, respectively, each comprise a horizontal trunk 193, a vertical trunk 192 proceeding perpendicular to the horizontal trunk 193, and a first to fourth small branches 194a, 194b, 194c, and 194d, respectively. Furthermore, the sub-pixel electrodes 191a and 191b can be divided into first to fourth sub-regions Da, Db, Dc, and Dd, respectively, by way of the horizontal and the vertical trunks 193 and 192, and the first to fourth sub-regions Da to Dd correspondingly comprise a plurality of first to fourth small branches 194a, 194b, 194c, and 194d, respectively.

The first small branches 194a obliquely extend from the horizontal trunk 193 or the vertical trunk 192 to a left top side, and the second small branches 194b obliquely extend from the horizontal trunk 193 or the vertical trunk 192 to a right top side. Furthermore, the third small branches 194c obliquely extend from the horizontal trunk 193 or the vertical trunk 192 to the left bottom side, and the fourth small branch 194d obliquely extend from the horizontal trunk 193 or the vertical trunk 192 to the right bottom side.

The first to fourth small branches 194a to 194d are disposed at an angle with the gate line 121 or the horizontal trunk 193 of about 45° or about 135°. Furthermore, the first and fourth small branches 194a and 194d of the two sub-region neighbors Da to Dd of the first to fourth sub-region neighbors Da to Dd can be disposed vertically opposed to each other.

The first and second sub-pixel electrodes 191a and 191b are electrically connected to the first and second drain electrodes 175a and 175b, respectively, through the first and second contact holes 185a and 185b, respectively, so as to receive a data voltage Vd from the first and second drain electrodes 175a and 175b, respectively. Upon receipt of the data voltage Vd, the first and second sub-pixel electrodes 191a and 191b and a common electrode 270, of the common electrode panel 200, generate an electric field to thereby select a direction of the liquid crystal molecules of the liquid crystal layer 3 between the pixel electrode 191 and the common electrode 270. A luminance of the light passing through the liquid crystal layer 3 is varied depending upon the selected direction of the liquid crystal molecules.

A side of the first to fourth small branches 194a to 194d deforms the electric field, and forms horizontal components for determining a tilt direction of the liquid crystal molecules 30. The horizontal components of the electric field proceed substantially parallel to the sides of the first to fourth small branches 194a to 194d. Accordingly, as shown in FIG. 6, the liquid crystal molecules 30 are tilted parallel to a longitudinal direction of the first to fourth small branches 194a to 194d. In an embodiment, the first sub-pixel electrodes 191a and two part of the second sub-pixel electrodes 191b each include four sub-regions Da to Dd that differ in the longitudinal direction of the first to fourth small branches 194a to 194d, and hence the liquid crystal molecules 30 are tilted roughly in four directions. Thus, in an embodiment, four domains where the first to fourth liquid crystal molecules 30a, 30b, 30c, and 30d, respectively differ in alignment direction from each other are disposed in the liquid crystal layer 3. In this way, as the liquid crystal molecules are tilted in various directions, and a reference viewing angle of the liquid crystal display is increased.

The first and second sub-pixel electrodes 191a and 191b, the common electrode 270 of the upper display panel 200, and the liquid crystal layer 3 interposed therebetween, form first and second liquid crystal capacitors Clca and Clcb, respectively, and can store the applied voltage even after the first and second thin film transistors Qa and Qb turn off.

The first and second sub-pixel electrodes 191a and 191b are overlapped with the first and second storage electrode lines 131a and 131b, respectively, wherein the first and second storage electrode lines 131a and 131b respectively comprise the first and second storage electrodes 137a and 137b. As the first and second openings 184a and 184b are disposed on a portion of the upper layer 180q of the passivation layer 180, which corresponds to a region where the first and second sub-pixel electrodes 191a and 191b and the first and second storage electrodes 137a and 137b overlap, and only the lower layer 180p of the passivation layer 180 is disposed in the region between the first and second sub-pixel electrodes 191a and 191b and the first and second storage electrodes 137a and 137b, respectively. Accordingly, a distance between the first and second sub-pixel electrodes 191a and 191b and the first and second storage electrodes 137a and 137b, respectively, can be reduced, and hence, a capacitance of the first and second storage capacitors Csta and Cstb, formed by the first and second sub-pixel electrodes 191a and 191b and the first and second storage electrodes 137a and 137b, respectively, can be increased.

The first and second contact assistants 81 and 82 are electrically connected to the gate line end portions 129 and data line end portions 179 of the gate lines 121 and the data lines 171, respectively, through the fourth and first contact holes 181 and 182, respectively. The first and second contact assistants 81 and 82 assist the adhesion of the gate line end portions 129 and the data line end portions 179 of the gate lines 121 and the data lines 171 to external devices, and can protect them.

An upper display panel 200 is described in detail.

A light blocking member 220 is disposed on an insulating substrate 210 and can comprise transparent glass, transparent plastic, or the like, or a combination comprising at least one of the foregoing materials. The light blocking member 220, also called "black matrix," can reduce or substantially prevent light leakage.

A plurality of color filters 230 can be disposed on the substrate 210. The color filters 230 can be disposed within regions defined by the light blocking member 220. The color filters 230 may longitudinally extend along the columns of pixel electrodes 191 in a vertical direction. The color filters 230 may each display a primary color, such as red, green, and blue.

An overcoat 250 can be disposed on the color filters 230 and the light blocking member 220, and a common electrode 270 can be disposed on the overcoat 250.

First and second alignment layers 11 and 21 can be disposed on the inner surfaces of each of the upper and lower display panels 100 and 200, respectively. The first and second alignment layers 11 and 21 may be vertical alignment layers.

The operation of the liquid crystal display is described in detail with reference to FIG. 9 and the previously described drawings FIG. 1 to FIG. 3.

Figure 9:
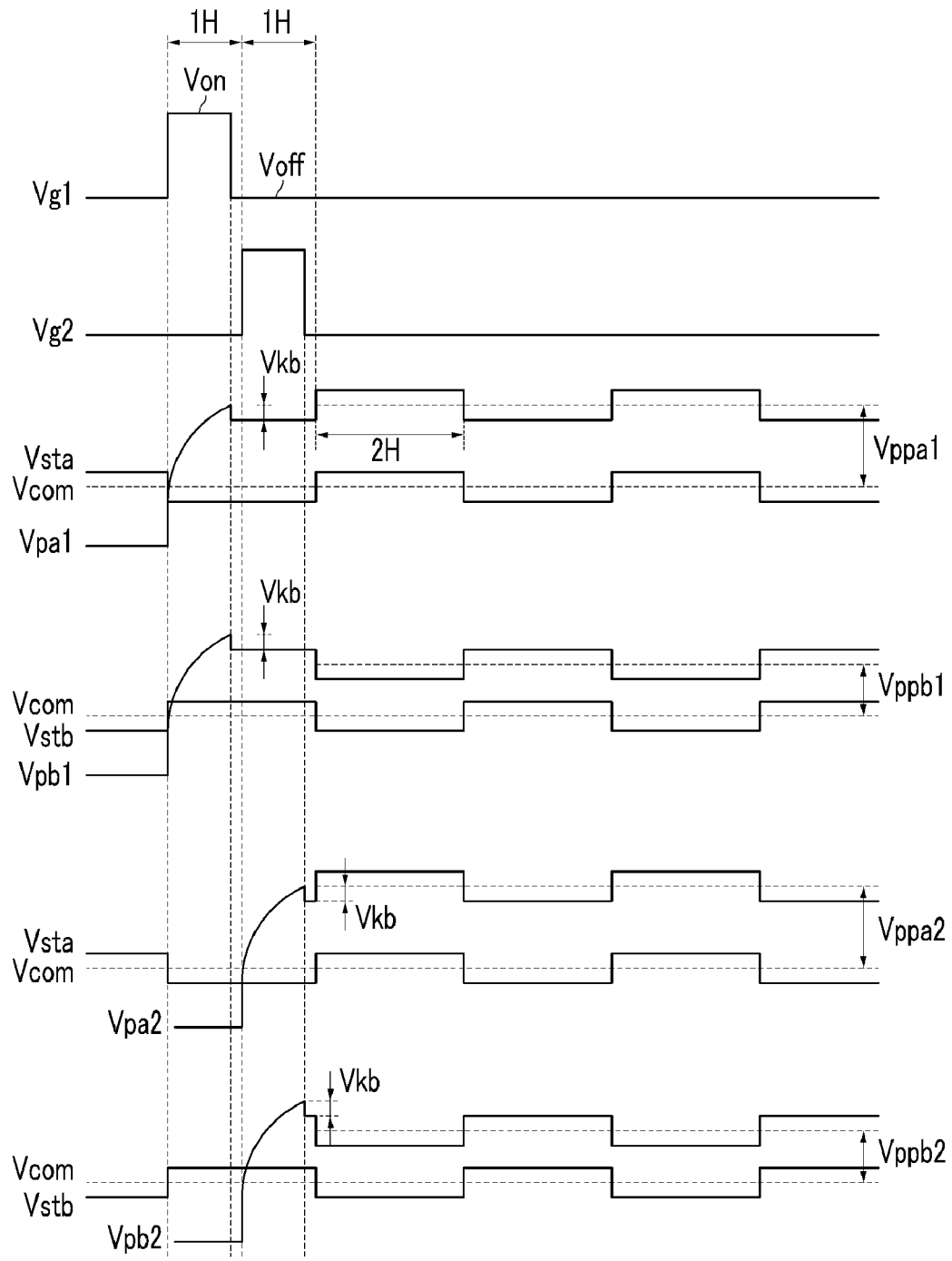
FIG. 9 is a waveform diagram showing an exemplary embodiment of driving voltages in a liquid crystal display.

FIG. 9 is a waveform diagram showing an exemplary embodiment of driving voltages for a liquid crystal display according to an exemplary embodiment.

The signal controller 600 receives first to third input image signals R, G, and B from an external graphics controller (not shown) together with input control signals for controlling them. The first to third input image signals R, G, and B contain information about the luminance of the respective first to third pixels PX1 to PX3. The luminance has a predetermined number of grays which, for example, amounts to 1024, which is $2^{10}$, 256, which is $2^8$, or 64, which is $2^6$. The input control signals may include a vertical synchronization signal Vsync, a horizontal synchronization signal Hsync, a main clock signal MCLK, and a data enable signal DE.

Upon receipt of the first to third input image signals R, G, and B, and the input control signals, the signal controller 600 processes the first to third input image signals R, G, and B depending upon the operating conditions of the liquid crystal panel assembly 300 and the data driver 500 to thereby generate a gate control signal CONT1 and a data control signal CONT2. The signal controller 600 then transmits the gate control signal CONT1 to the gate driver 400, while it outputs the data control signal CONT2 and the processed image signal DAT to the data driver 500. The output image signal DAT has a selected number of values or grays as a digital signal.

The gate control signal CONT1 includes a scanning start signal STV for instructing a scanning start, and at least one clock signal for controlling the output cycle of the gate-on voltage Von. The gate control signal CONT1 may further include an output enable signal OE for defining the duration time of the gate-on voltage Von.

The data control signal CONT2 includes a horizontal synchronization start signal STH for instructing the start of transmission of the image data to a bundle of sub-pixels, and a load signal LOAD and a data clock signal HCLK for instructing application of a data voltage to the liquid crystal panel assembly 300. The data control signal CONT2 may further include an inversion signal RVS for inverting the voltage polarity of the data voltage with respect to the common voltage Vcom (hereinafter abbreviated as the "data signal polarity").

The storage electrode driver 700 applies the first and second storage electrode voltages Vsta and Vstb to the first and second storage electrode lines SLa and SLb, respectively, in accordance with the storage electrode control signal CONT3 from the signal controller 600. The first and second storage electrode voltages Vsta and Vstb are cyclically inverted with respect to the common voltage Vcom, and are opposite in phase to each other. The cycle of the first and second storage electrode voltages Vsta and Vstb may be two horizontal periods (also referred to as "2H"), and can coincide with one cycle of the horizontal synchronization signal Hsync and the data enable signal DE.

Depending upon the data control signal CONT2 from the signal controller 600, the data driver 500 can receive the digital image signals DAT related to a bundle of sub-pixels, and select gray voltages corresponding to the respective digital image signals DAT so as to convert the digital image signals DAT into analog data voltages, followed by applying them to the relevant data lines.

The gate driver 400 applies the gate-on voltage Von to the gate line GL in accordance with the gate control signal CONT1 from the signal controller 600, and turns on the first and second switching elements Qa and Qb which are electrically connected to the gate line GL. Then, the data voltages applied to the data lines DL are applied to the relevant sub-pixels through the first and second switching elements Qa and Qb, which are turned-on.

Although the first and second sub-pixel electrodes 191a and 191b, which form one pixel electrode 191, are separately electrically connected to the first and second switching elements Qa and Qb, the first and second switching elements Qa and Qb are electrically connected to the same gate line GL and to the same data line DL. Therefore, the first and second switching elements Qa and Qb can receive the same data voltage Vd from the same data line DL at the same time.

Specifically, when the first gate voltage Vg1 applied to the first gate line shifts from the gate-off voltage Voff to the gate-on voltage Von, the relevant switching elements, such as first and second switching elements Qa and Qb, turn on, and the first sub-pixel electrode voltage Vpa1 and the second sub-pixel electrode voltage Vpb1 of the first pixel row are equally raised up to a selected level. Thereafter, as the first gate voltage Vg1 shifts from the gate-on voltage Von to the gate-off voltage Voff, the first and second switching elements Qa and Qb turn off, and the first and second sub-pixel electrodes PEa and PEb are disposed in a floating state. At this time, under the influence of the shift of the gate voltage Vg1 from the gate-on voltage Von to the gate-off voltage Voff, the respective first and second sub-pixel electrode voltages Vpa1 and Vpb1 are reduced by the amount of a kickback voltage Vkb.

Also, in an embodiment, the first and second sub-pixel electrodes PEa and PEb form capacitors Csta and Cstb in conjunction with the first and second storage electrode lines SLa and SLb, the voltage of the first and the second sub-pixel electrodes PEa and PEb is varied depending upon the variation in the first and second storage electrode voltages Vsta and Vstb flowing along the first and second storage electrode lines SLa and SLb, and accordingly, the first and second sub-pixel electrode voltages Vpa1 and Vpb1 of the first and second sub-pixel electrodes PEa and PEb are altered.

Consequently, as shown in FIG. 9, an effective value of the first sub-pixel electrode voltage Vpa1 of the first pixel row is Vppa1, and an effective value of the second sub-pixel electrode voltage Vpb1 is Vppb1, which can be smaller than an effective value of the first sub-pixel electrode voltage Vpa1.

The difference between the first sub-pixel electrode voltage Vpa1 and the common voltage Vcom is the voltage charged at the first liquid crystal capacitor Clca, and the difference between the second sub-pixel electrode voltage Vpb1 and the common voltage Vcom is the voltage charged at the second liquid crystal capacitor Clcb.

In this way, as a potential difference is formed between both ends of the first and second liquid crystal capacitors Clca and Clcb, a primary electric field is generated over the liquid crystal layer 3 which is substantially vertical relative to the surface of the upper and lower display panels 100 and 200, respectively. Accordingly, the liquid crystal molecules of the liquid crystal layer 3 are inclined in response to the electric field such that directors thereof stand vertically relative to a direction of the electric field. A degree of variation in a polarization of light incident upon the liquid crystal layer 3 is altered depending on a degree inclination of the liquid crystal molecules. The variation in polarization is expressed by the variation in transmittance through the polarizers, and accordingly, the liquid crystal display displays the desired image.

The inclination degree of the liquid crystal molecules is altered depending upon the intensity of the electric field. As the two liquid crystal capacitors Clca and Clcb differ in voltage from each other, the liquid crystal molecules are differentiated in inclination degree from each other, and accordingly, the two sub-pixels are differentiated in luminance from each other. Therefore, in an embodiment where the first liquid crystal capacitor Clca coincides in voltage to the second liquid crystal capacitor Clcb, the image viewed from the lateral side approximates the image viewed from the frontal side, thus, the lateral gamma curve approximates the frontal gamma curve. In this way, the lateral visibility can be enhanced.

Also, in an embodiment, when the second gate voltage Vg2 applied to the second gate line shifts from the gate-off voltage Voff to the gate-on voltage Von, the relevant switching elements, such as the first or the second switching elements Qa or Qb, turn on, and the first sub-pixel electrode voltage Vpa2 and the second sub-pixel electrode voltage Vpb2 of the second pixel row are likewise raised up to a selected level. Thereafter, the second gate voltage Vg2 shifts from the gate-on voltage Von to the gate-off voltage Voff, the first and second switching elements Qa and Qb turn off, and the first and second sub-pixel electrodes PEa and PEb are in a floating state. At this time, under the influence of the voltage shift of the gate voltage Vg2 from the gate-on voltage Von to the gate-off voltage Voff, the respective sub-pixel electrode voltages Vpa2 and Vpb2 are reduced by the amount of a kickback voltage Vkb.

Thereafter, the respective first and second sub-pixel electrode voltages Vpa2 and Vpb2 are altered depending upon a variation in the first and the second storage electrode voltages Vsta and Vstb. The respective first and second sub-pixel electrode voltages Vpa2 and Vpb2 are differentiated from each other. Because the cycle of the first and second storage electrode voltages Vsta and Vstb is 2H, as shown in FIG. 9, the effective value of the first sub-pixel electrode voltage Vpa2 of the second pixel row is Vppa2, and the effective value of the second sub-pixel electrode voltage Vpb2 of the second pixel row is Vppb2, which is smaller than the effective value of the first sub-pixel electrode voltage Vpa2. Consequently, the first and second sub-pixel electrode voltages Vpa2 and Vpb2 of the second pixel row are altered with a shape similar to that of the first and second sub-pixel electrode voltages Vpa1 and Vpb1 of the first pixel row.

As described above, a liquid crystal panel assembly according to an exemplary embodiment is driven using a 2×1 dot inversion method. With the 2×1 dot inversion driving mode, only when the cycle of the first and the second storage electrode voltages Vsta and Vstb is 2H may the two sub-pixel electrode voltages Vpa1 and Vpb1, or Vpa2 and Vpb2 differ from each other while keeping the 2×1 dot inversion driving constant. Furthermore, in an embodiment where the cycle of the first and second storage electrode voltages Vsta and Vstb is 2H, the first and second storage electrode voltages Vsta and Vstb are substantially prevented from being delayed, thereby applying the voltage in a desired fashion, rather than where the cycle of the first and second storage electrode voltages Vsta and Vstb is, for instance, 1H.

This process is repeated by the unit of one horizontal period, thereby applying data voltages to all of the pixels, including the first to the third pixels PX1 to PX3, and displaying the images in one frame.

A liquid crystal display according to another exemplary embodiment is described with reference to FIG. 10.

Figure 10:
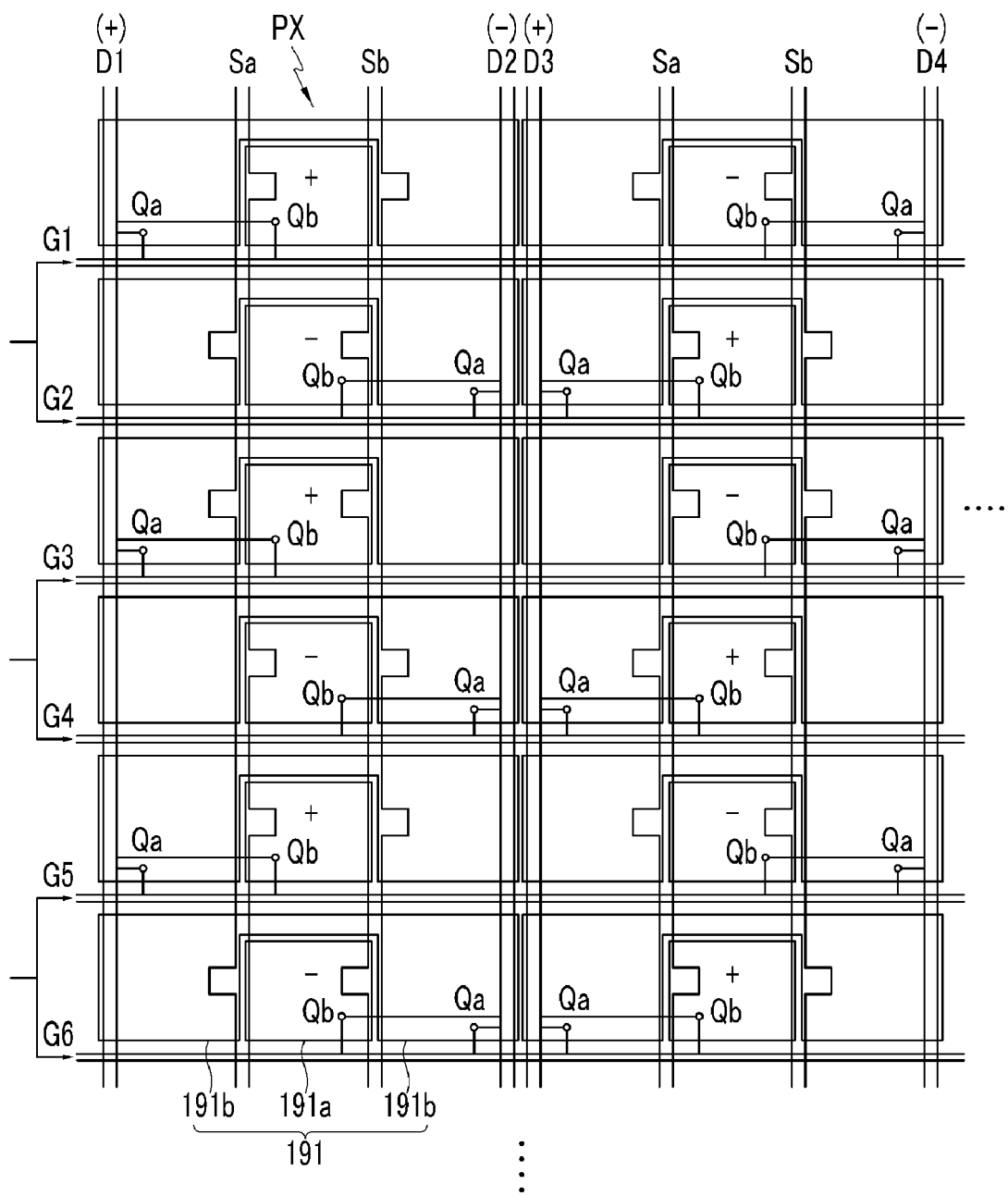
FIG. 10 is a plan view showing an exemplary embodiment of a liquid crystal panel assembly.

FIG. 10 is a plan view showing an exemplary embodiment of a liquid crystal display.

As shown in FIG. 10, a liquid crystal display according to an exemplary embodiment includes a plurality of first to sixth gate lines G1, G2, G3, G4, G5, and G6 and a plurality of pairs of first to fourth data lines D1, D2, D3, and D4 configured in pairs and disposed perpendicular to the first to sixth gate lines G1 to G6. A plurality of pairs of first and second switching elements Qa and Qb are electrically connected to the first to sixth gate lines G1 to G6, the first to fourth data lines D1 to D4, and the pixel electrodes 191, which comprise the first and second sub-pixel electrodes 191a and 191b. The first and second switching elements Qa and Qb are electrically connected to first and second storage electrode lines Sa and Sb, respectively, and are overlapped with the first and second sub-pixel electrodes 191a and 191b.

Compared with the liquid crystal display shown in FIG. 4, the liquid crystal display shown in FIG. 10 is uniquely structured such that the pair of data lines D1 and D2 are disposed on a left side of a pixel column and the pair of data lines D3 and D4 are disposed on a right side thereof, while the data voltages Vd applied to the respective data lines D1 to D4 are driven by column inversion, and neighboring data lines are opposite in polarity to each other.

Accordingly, the apparent inversion of the liquid crystal panel assembly shown in FIG. 9 is 1×1 inversion driving. Accordingly, a pixels PX are opposite in polarity to neighboring pixels PX in a row and a column direction.

Furthermore, the neighboring gate lines G1 and G2, G3 and G4, and G5 and G6 are electrically connected to each other. The same gate voltage Vg is applied to the gate line pairs G1 and G2, G3 and G4, and G5 and G6, which are electrically connected to each other. Accordingly, the pixels PX disposed in the first and second pixel rows are simultaneously charged by the respective data voltages Vd, the pixels PX disposed in the third and fourth pixel rows are simultaneously charged by the respective data voltages Vd, and the pixels PX disposed in the fifth and sixth pixel rows are simultaneously charged by the respective data voltages Vd.

Also, in an embodiment, regarding the first pixel row, the first storage electrode line Sa can be overlapped with the first sub-pixel electrode 191a, and the second storage electrode line Sb can be overlapped with the second sub-pixel electrode 191b. Differing from the electrode line arrangement of the first pixel row, regarding the second pixel row, the first storage electrode line Sa can be overlapped with the second sub-pixel electrode 191b, and the second storage electrode line Sb can be overlapped with the first sub-pixel electrode 191a. The electrode line arrangement of the third pixel row is the same as that of the second pixel row. In the subsequent pixel rows, the first and second storage electrode lines Sa and Sb can be electrically connected to each other with the same pattern per every two pixel rows. With the two pixel column neighbors, the electrical connectivity between the first and the second storage electrode lines Sa and Sb are opposite to each other. The cycle of the first and second storage electrodes Vsta and Vstb applied to the first and second storage electrode lines Sa and Sb is established to be 2H. Accordingly, with the configuration shown in FIG. 10, the two sub-pixel electrodes 191a and 191b may differ in voltage from each other by way of 1×1 dot inversion driving.

Also, in an embodiment, both lateral sides of the second sub-pixel electrode 191b can be overlapped with the first to fourth data lines D1 to D4. The liquid crystal panel assembly shown in FIG. 10 is roughly similar in cross-sectional structure to the liquid crystal panel assembly shown in FIG. 7. The liquid crystal panel assembly shown in FIG. 10 also comprises a passivation layer like the passivation layer 180 shown in FIG. 7. The passivation layer (not shown) of the liquid crystal panel assembly shown in FIG. 10 may comprise an organic insulator, which is capable of being enlarged in thickness with a low dielectric constant. Accordingly, even though the second sub-pixel electrode 191b and the first to fourth data lines D1 to D4 are overlapped with each other, the potential parasitic capacitance between the second sub-pixel electrode 191b and the first to fourth data lines D1 to D4 can be reduced or substantially prevented.

A liquid crystal display according to another embodiment is described in detail with reference to FIG. 11 and FIG. 12.

Figure 11:
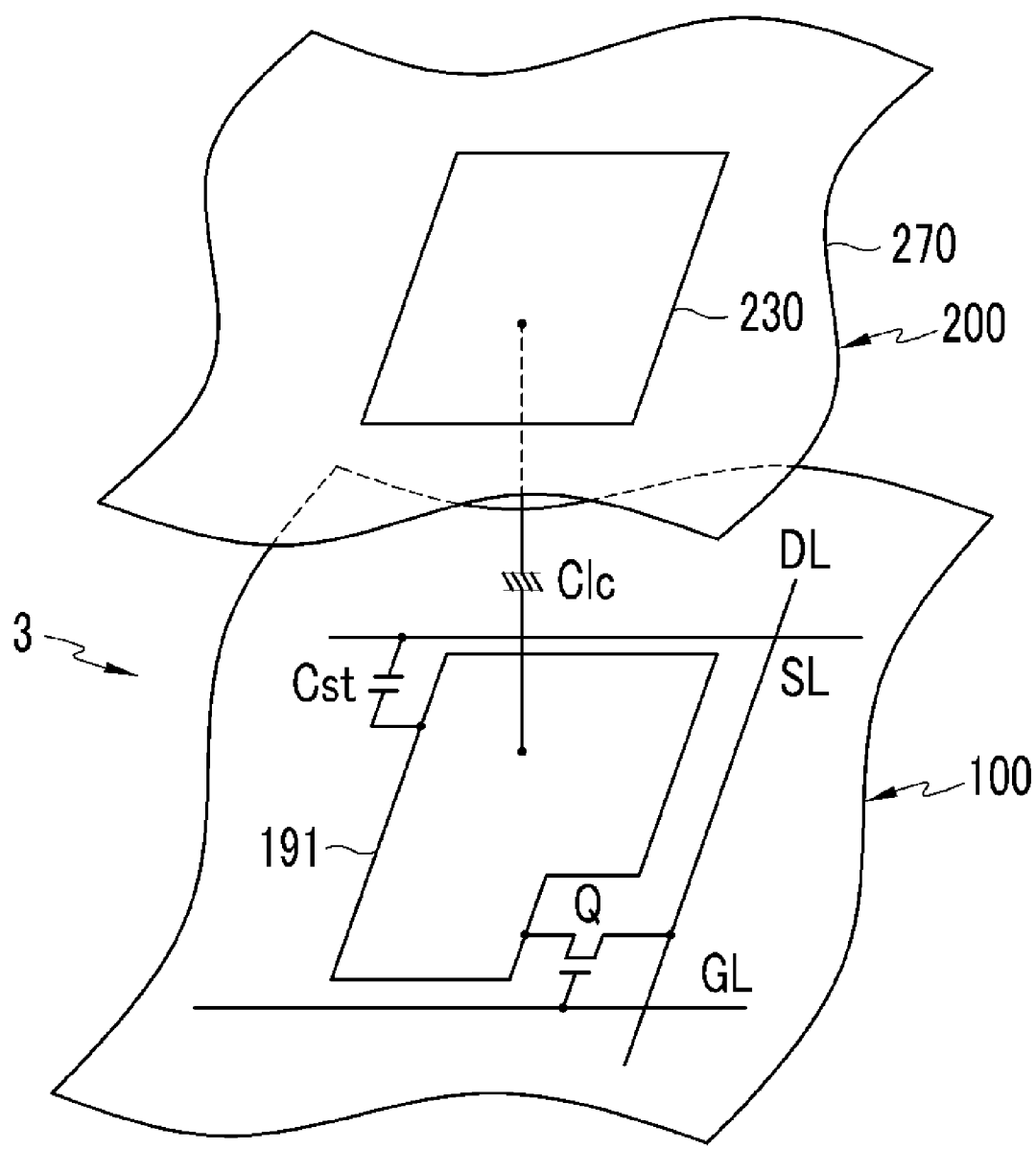
FIG. 11 is an equivalent circuit diagram showing an exemplary embodiment of a pixel in a liquid crystal display.
Figure 12:
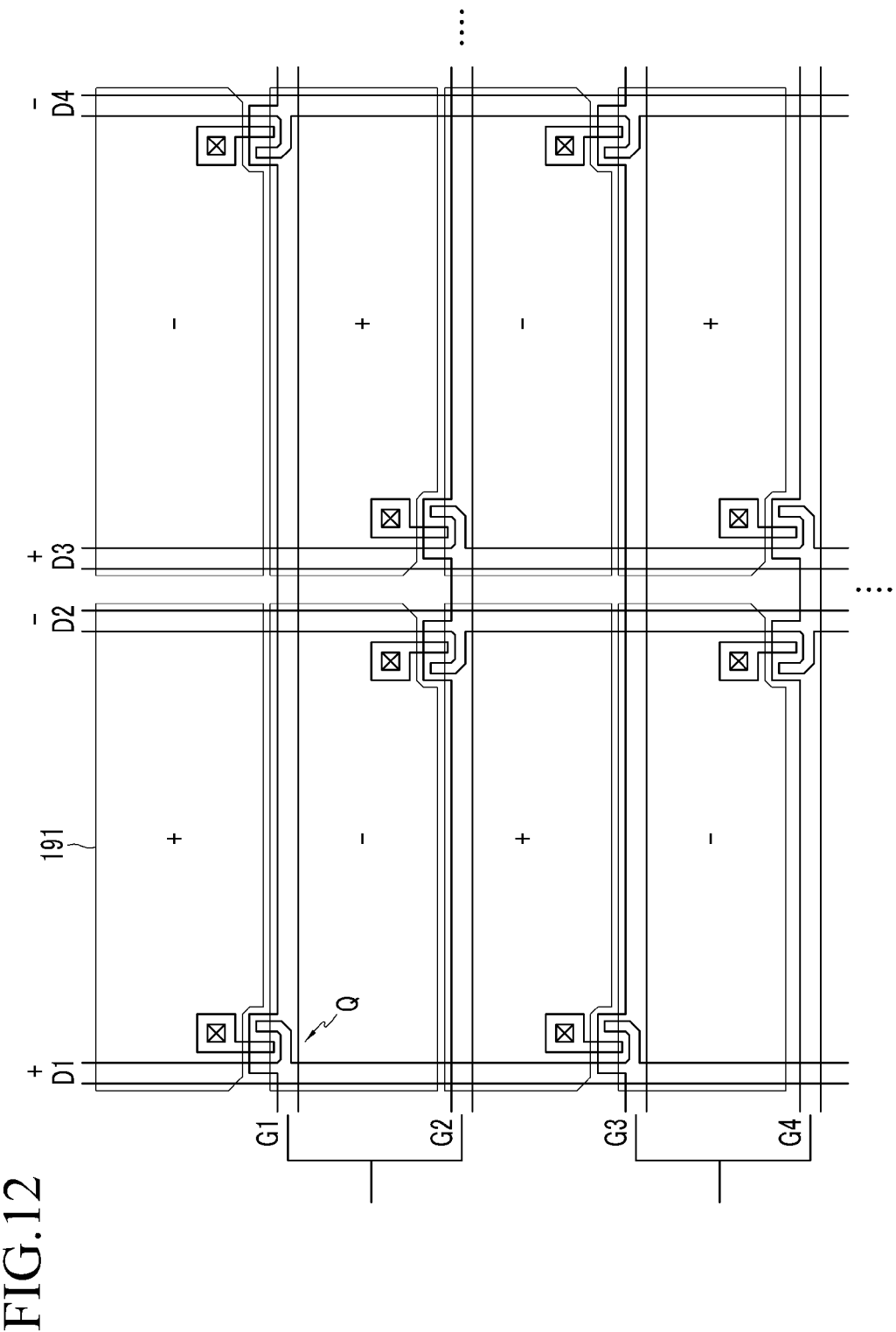
FIG. 12 is a plan view showing an exemplary embodiment of a liquid crystal display comprising the pixel shown in FIG. 11.

FIG. 11 is a circuit diagram of an exemplary embodiment of a pixel in a liquid crystal display according to another exemplary embodiment, and FIG. 12 is a plan view showing an exemplary embodiment of the liquid crystal display shown in FIG. 11.

Referring to FIG. 11, a liquid crystal display according to an exemplary embodiment includes a lower display panel 100 and an upper display panel 200 facing each other, and a liquid crystal layer 3 interposed between the lower and the upper display panels 100 and 200, respectively. The pixels PX each have a switching element Q electrically connected to the display signal lines, which comprise a gate lines GL, a data lines DL, and a storage lines SL, and a liquid crystal capacitor Clc and a storage capacitor Cst are electrically connected to each switching element Q, which comprises a pixel electrode 191 and a common electrode 270 as terminals. Because the switching element Q, and the liquid crystal capacitor Clc and the storage capacitor Cst, which are electrically connected to the switching element Q, have the same structure as those previously described, detailed description thereof will be omitted.

Differing from the liquid crystal display shown in FIG. 2, in the liquid crystal display shown in FIG. 11 the pixel electrode 191 is not divided, but is disposed as a single unitary body.

Referring to FIG. 12, the liquid crystal display according to the present exemplary embodiment includes a plurality of first to fourth gate lines G1, G2, G3, and G4, a plurality of first to fourth data lines D1, D2, D3, and D4, a plurality of switching elements Q electrically connected to the first to fourth gate lines G1 to G4 and the first to fourth data lines D1 to D4, and a plurality of pixel electrodes 191, each electrically connected to the switching elements Q. As with the liquid crystal display shown in FIG. 10, the liquid crystal display shown in FIG. 12 is structured such that a pair of data lines, such as the first and second data lines D1 and D2, and/or the third and fourth data lines D3 and D4, are disposed in a pixel column, and neighboring gate lines, such as the first and second gate lines G1 and G2, and the third and fourth gate lines G3 and G4, are electrically connected to each other, respectively. The data voltages Vd applied to the neighboring data lines D1 to D4 are opposite in polarity to each other.

In another embodiment, differing from the liquid crystal display shown in FIG. 10, the liquid crystal display shown in FIG. 12 is uniquely structured such that any two neighboring pixel electrodes 191 in the pixel row direction are electrically connected to different data lines, respectively, which are placed either on the left side of the pixel electrode 191 or on the right side thereof. In addition, any two neighboring pixel electrodes in the column direction are also electrically connected to different data lines, respectively, which are placed either on the left side of the pixel electrode 191 or on the right side thereof. Accordingly, the apparent inversion of the liquid crystal display according to an exemplary embodiment is 1×1 dot inversion, as shown in the liquid crystal display shown in FIG. 10.

Furthermore, the liquid crystal display shown in FIG. 12 is structured differently from the liquid crystal display shown in FIG. 10 such that the pixel electrode 191 is disposed as a single unitary body, and hence, as it is not needed to control two sub-pixel electrode voltages differently, and the storage electrode line receiving the cyclic signal can be omitted. Although not shown in FIG. 12, storage electrode lines receiving the common voltages Vcom and overlapped with the pixel electrode 191 may be disposed.

While this invention has been described in connection with exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
    a pixel electrode having first and second sub-pixel electrodes separated from each other;
    a gate line electrically connected to the first and second sub-pixel electrodes through thin film transistors;
    a data line electrically connected to the first and second sub-pixel electrodes through the thin film transistors;
    a storage electrode line having a first storage electrode overlapped with the first sub-pixel electrode, wherein a first storage voltage is applied to the first storage electrode line as a cyclic signal; and
    a second storage electrode line having a second storage electrode overlapped with the second sub-pixel electrode, wherein a second storage electrode voltage opposite in phase to the first storage electrode voltage is applied to the second storage electrode line as a cyclic signal, and
    wherein the first and second sub-pixel electrodes are electrically connected to the same gate line and to the same data line through the thin film transistors, and the pixel electrode comprises a first side disposed parallel to the gate line and a second side disposed parallel to the data line, the second side comprising a length which is less than a length of the first side.

2. The liquid crystal display of claim 1, wherein the first and second storage electrode voltages each have a cycle of 2H.

3. The liquid crystal display of claim 2, wherein the pixel electrodes is disposed in a same pixel column and pairs of neighboring pixel electrodes are electrically connected to the same data line.

4. The liquid crystal display of claim 3, wherein a plurality of data voltages are applied to the same data line and have the same polarity during a period of one frame.

5. The liquid crystal display of claim 4, wherein the data line includes two data lines neighboring each other and the data voltages applied to the two data lines neighboring each other are opposite in polarity.

6. The liquid crystal display of claim 5, further comprising an organic insulator interposed between the pixel electrode and the gate line and the data line, wherein the pixel electrode is overlapped with the gate line or the data line.

7. The liquid crystal display of claim 6, wherein the first and second sub-pixel electrodes each comprise a plurality of branches, each of the branches comprising a side, the sides of the branches disposed in different directions relative to each other.

8. The liquid crystal display of claim 7, wherein the sides of the branches are disposed at an angle of about 45° or about 135° with respect to the gate line.

9. The liquid crystal display of claim 1, wherein the second sub-pixel electrode is bisected into two parts by the first sub-pixel electrode.

10. The liquid crystal display of claim 9, wherein the first and second storage electrode lines each traverse a gap disposed between the first and second sub-pixel electrodes.

11. The liquid crystal display of claim 10, wherein the first and second storage electrode lines are disposed parallel to the data line.

12. The liquid crystal display of claim 1, wherein the length of the first side is about three times the length of the second side.

* * * * *